March 15, 1932.   I. SHORT   1,849,596

REDUCTION GEARING

Filed June 30, 1930

WITNESS

INVENTOR
Ira Short.
BY
ATTORNEY

Patented Mar. 15, 1932

1,849,596

UNITED STATES PATENT OFFICE

IRA SHORT, OF ESSINGTON, PENNSYLVANIA, ASSIGNOR TO WESTINGHOUSE ELECTRIC & MANUFACTURING COMPANY, A CORPORATION OF PENNSYLVANIA

REDUCTION GEARING

Application filed June 30, 1930. Serial No. 464,917.

My invention relates to reduction gearing of the floating frame type and it has for its object to provide apparatus of this character capable of compensating for torsional deflection of the pinion in order to avoid concentration of stresses in the pinion teeth.

Reduction gearing of the right and left-hand helically-toothed type wherein the pinion is capable of axial movement and is carried by a floating frame has been used extensively. Equality of tooth pressures is secured by right and left-hand toothed helices and free end play of the pinion, and moments of tooth pressures are equalized by a floating frame, the latter carrying the pinion and being capable of tilting movement in a plane normal to the plane of the gear and pinion axes. As the driving shaft is usually connected to one end of the pinion, that end will be subjected to the maximum amount of torsional deflection, which diminishes toward the other end; and such deflection, particularly with wide-faced pinions, tends to cause concentrated or intensified stresses on portions of the teeth adjacent to the driving end. I overcome this condition of concentrated or intensified tooth stresses by so proportioning the frame that, at any load, it yields or bends to compensate for torsional deflection of the pinion, whereby better engaging contact of the pinion and gear teeth is maintained. In other words, assuming that a pinion tooth should have a given position in space in order to bear uniformly on a gear tooth, torsional deflection causes movement of the pinion tooth away from this position; however, the same force causing torsional deflection acts on the frame tending to deflect the latter in such a direction as to move the pinion tooth contrary to the movement due to torsional deflection, and, in accordance with my invention, the frame is designed to deflect to move the pinion, and, therefore, the tooth in question, in a direction contrary to the direction in which they move due to torsional deflection and to the same extent, whereby substantially uniform bearing of the pinion tooth on the gear tooth may be had at all loads.

In copending application Serial No. 464,948, filed June 30, 1930, (Case No. 7000) of Henry F. Schmidt, and assigned to Westinghouse Electric & Manufacturing Company, there is disclosed and claimed a form of floating frame which is unsymmetrical, the side adjacent to the coupling being made relatively lighter and more flexible than the other. Instead of an unsymmetrical frame, I provide a symmetrical frame having suitable flexibility, it is balanced, and, although the degree of flexibility is the same at either end, non-uniform flexure of the frame is not objectionable because of the capacity of the frame to tilt and of the pinion to move endwise. The principal advantage of the present invention is that a reduction gear may be made lighter because of the substantially uniform tooth pressure from end to end of the teeth despite torsional deflection of the pinion. Heretofore, it has been the practice to design a pinion large enough so that, for the power transmitted, the unit tooth pressure would not be exceeded; and, in order not to exceed this limitation, it was quite important to have enough torsional rigidity in the pinion to reduce torsional deflection to negligible proportions. The present invention removes pinion torsional deflection as a limiting factor with the result that the pinion may be made smaller in diameter and shorter with consequent reduction in dimensions of the driven gear and, for a given power, reduction in the overall-size and weight of the reduction gear.

These and other objects are effected by my invention, as will be apparent from the following description and claims taken in connection with the accompanying drawings forming a part of this application, in which:

Figure 1:
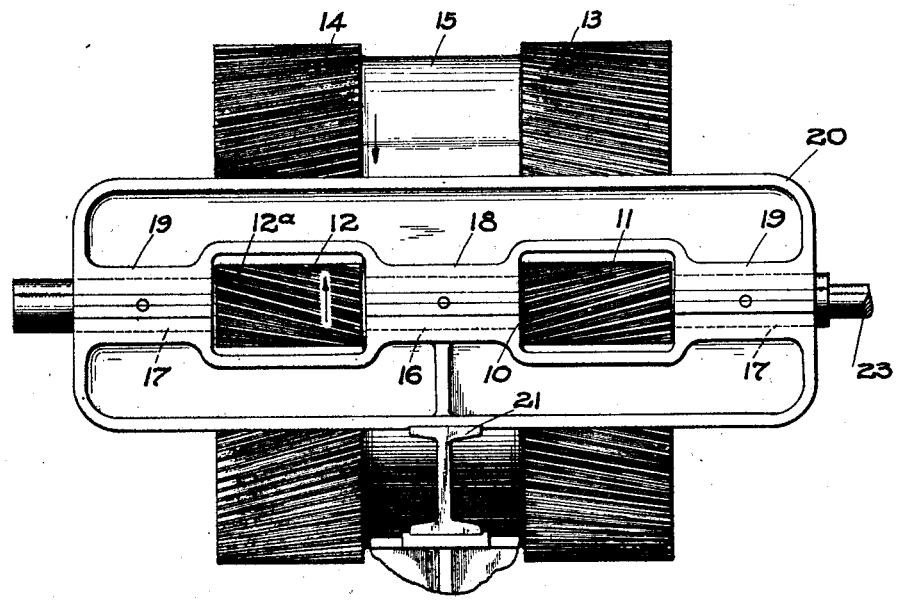
Fig. 1 is a fragmentary view of reduction gearing incorporating my improvement.

Referring now to the drawings more in detail, I show a reduction gear having a pinion 10 provided with left and right-hand helically-toothed portions 11 and 12 meshing with right and left-hand helically-toothed portions 13 and 14, respectively, of the driven gear 15. The pinion 10 has intermediate and terminal journal portions 16 and 17, 17 fitting the intermediate and terminal bearings 18, and 19, 19, respectively, of the frame 20 supported in such a manner as to provide for tilting thereof about an intermediate axis. For example, the frame 20 is supported by an I-beam member 21.

The pinion is hollow and has extending therethrough a driving shaft 23 connected to the pinion by a slip joint 24 at the remote end. The pinion has end play with respect to the frame bearings, whereby equalization of tooth pressures is assured; and the frame 20 tilts so as to equalize the moments of tooth pressures. The tilting movement of the frame 20 for the purpose just referred to is restricted by means of struts 25 to a plane normal to the plane of the pinion and gear axes or to a plane parallel to the tangent plane of the pinion and gear pitch circles.

In gearing of the type referred to, as the driving shaft 23 is connected to one end of the pinion 10, the maximum amount of torsional deflection will take place adjacent to the power end and this deflection diminishes toward the other end. In Fig. 1, assuming that the pinion rotates the gear in the direction of the arrows, then the effect of torsional deflection on a tooth, for example, 12a is to increase the helix angle toward the left-hand end, whereby the position of such a tooth does not fit exactly with a cooperating gear tooth with the result that concentrated stresses are imposed on the pinion and gear teeth because of lack of uniform engagement of the teeth from end-to-end.

The same force which causes torsional deflection of the pinion also causes deflection of the frame 20. For example, assuming the gear to be rotated by the pinion as indicated by the arrows in Fig. 1, the pinion journal portions act on the frame 20 tending to cause the latter to be deflected upwardly; and, if the frame is of suitable design, it deflects sufficiently so as to move a pinion tooth to an extent sufficient to compensate for such torsional deflection, whereby the pinion teeth, even though torsionally deflected, may press substantially uniformly from end-to-end against the gear teeth.

Figure 4:
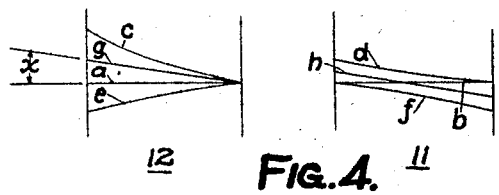
Fig. 4 is a diagrammatic view illustrative of the effect of torsional deflection on the pinion.
Figure 2:
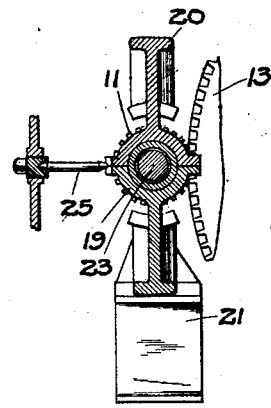
Fig. 2 is a fragmentary detail view showing supporting strut means for the floating frame.
Figure 3:
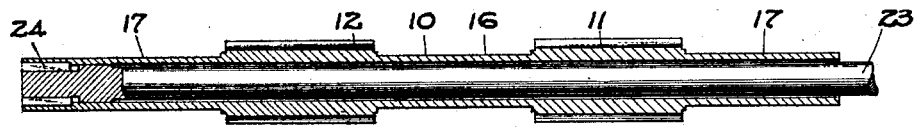
Fig. 3 is a longitudinal sectional view of the pinion.

Referring to Fig. 4, the straight lines $a$ and $b$ indicate the conditions that would exist if the deflection was uniform from end-to-end of the pinion. The curve $c$ is the torsion elastic curve for the pinion portion 12 and the curve $d$ is the torsion elastic curve for the pinion portion 11. The torsional deflection taking place in the pinion portion 12 is much greater than that taking place in the pinion portion 11 owing to the portion 12 having to transmit the torsional load of the portion 11 in addition to its own load, the slidable joint connection between the driving shaft and the pinion being adjacent to the pinion portion 12. Due to the flexibility of the frame 20, allowing the bearings 19 to become out of line with the central bearing 18, the pinion would tend to assume a shape indicated by elastic curve $e$ for the pinion portion 12 and by the elastic curve $f$ for the pinion portion 11, this deflection being equal where the frame 20 is symmetrical. As the deflections represented by the pairs of curves $c$ and $e$, for the pinion portion 12, and $d$ and $f$, for the pinion portion 11, take place simultaneously in opposite directions, the curves $g$ and $h$ represent the resultant elastic curves, respectively, of the pinion portions 12 and 11. The resultant curves $g$ and $h$ will be substantially straight lines and the frame 20 and the pinion portions 11 and 12 may be so co-related, so far as design and elastic properties are concerned, that the curves $g$ and $h$ will be parallel. With the latter curves parallel and the frame mounted flexibly on the I-beam 21, the frame will rotate through the angle $x$ bringing the teeth of the pinion in contact with the teeth of the gear for the full face width.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:—

1. In a reduction gear, in combination, a gear having right and left-hand rows of helical teeth, a pinion having left and right-hand rows of helical teeth meshing with the gear teeth, the pinion having intermediate and terminal journal portions, a driving shaft having a slidable joint connection with one end of the pinion, and a floating frame having intermediate and terminal bearings fitting the intermediate and terminal journal portions of the pinion, said frame being symmetrical with respect to the intermediate bearing and said frame and pinion being constructed and arranged to bend or bow sufficiently under load to effect lateral displacement of the pinion teeth sufficient to compensate for torsional displacement thereof, whereby, with torsional deflection of the pinion under load, the tooth pressure is distributed from end to end of the pinion.

2. In a reduction gear, in combination, a gear having right and left-hand rows of helical teeth, a pinion having left and right-hand rows of helical teeth meshing with the gear teeth, the pinion having intermediate and terminal journal portions, a frame having intermediate and terminal bearings fitting the journal portions, supporting means cooperating with the intermediate portion of said frame and providing for tilting movement of the latter in a plane normal to the common plane of the pinion and gear axes, said frame being symmetrical with respect to the intermediate bearing and said frame and pinion being constructed and arranged to bend or bow sufficiently under load to effect lateral displacement of the pinion teeth sufficient to compensate for torsional displacement thereof, whereby, with torsional deflection of the pinion under load, the tooth pressure is distributed from end to end of the pinion.

In testimony whereof, I have hereunto subscribed my name this 27th day of June, 1930.

IRA SHORT.